(12) United States Patent
Wannemacher et al.

(10) Patent No.: US 11,505,209 B2
(45) Date of Patent: Nov. 22, 2022

(54) SYSTEM FOR AUTOMATED DRIVING WITH ASSISTANCE FOR A DRIVER IN PERFORMING A NON-DRIVING ACTIVITY

(71) Applicant: Continental Automotive GmbH, Hannover (DE)

(72) Inventors: Christoph Wannemacher, Schwalbach (DE); Stephan Cieler, Schwalbach (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 85 days.

(21) Appl. No.: 16/761,225

(22) PCT Filed: Oct. 17, 2018

(86) PCT No.: PCT/EP2018/078391
§ 371 (c)(1),
(2) Date: May 1, 2020

(87) PCT Pub. No.: WO2019/091729
PCT Pub. Date: May 16, 2019

(65) Prior Publication Data
US 2020/0353953 A1    Nov. 12, 2020

(51) Int. Cl.
*B60W 60/00* (2020.01)
*B60W 40/08* (2012.01)
(Continued)

(52) U.S. Cl.
CPC ...... *B60W 60/00136* (2020.02); *B60W 40/08* (2013.01); *B60W 50/14* (2013.01);
(Continued)

(58) Field of Classification Search
CPC ....... B60W 60/00136; B60W 60/0053; B60W 40/08; B60W 50/14; B60W 2540/21; B60W 2540/229; B60W 2420/42; G06K 9/00845
See application file for complete search history.

(56) References Cited

U.S. PATENT DOCUMENTS 7,126,583 B1 * 10/2006 Breed .................... B60K 37/06
345/173
10,235,122 B1 * 3/2019 Goel ...................... G06V 20/56
(Continued)

FOREIGN PATENT DOCUMENTS

DE    10 2007 042 580    3/2009
DE    10 2007 042 581    3/2009
(Continued)

OTHER PUBLICATIONS

International Search Report issued in corresponding PCT Application PCT/EP2018/078391.
(Continued)

*Primary Examiner* — Peter D Nolan
*Assistant Examiner* — Tanya C Sienko
(74) *Attorney, Agent, or Firm* — Cozen O'Connor

(57) ABSTRACT

An automated driving system with assistance for a driver in performing a non-driving activity includes an assistance device configured to assist the driver in performing the non-driving activity. The automated driving system, in a first operating state controls the vehicle in an automated manner, and in a second operating state hands over control of the vehicle to the driver. The assistance device is configured to assist the driver in performing the non-driving activity if the automated driving system switches from the first operating state to the second operating state.

9 Claims, 1 Drawing Sheet

(51) Int. Cl.
 *B60W 50/14* (2020.01)
 *G06V 20/59* (2022.01)
(52) U.S. Cl.
 CPC ....... *B60W 60/0053* (2020.02); *G06V 20/597* (2022.01); *B60W 2420/42* (2013.01); *B60W 2540/21* (2020.02); *B60W 2540/229* (2020.02)

(56) References Cited

U.S. PATENT DOCUMENTS

| | | | |
|---|---|---|---|
| 2007/0280505 A1* | 12/2007 | Breed | B60W 40/08 |
| | | | 382/104 |
| 2013/0246926 A1* | 9/2013 | Vemireddy | G06F 16/9535 |
| | | | 715/738 |
| 2015/0120124 A1* | 4/2015 | Bartels | B60W 50/10 |
| | | | 701/23 |
| 2017/0102700 A1* | 4/2017 | Kozak | G05D 1/0061 |
| 2017/0343365 A1* | 11/2017 | Mokhnatkina | G01C 21/343 |
| 2017/0368936 A1* | 12/2017 | Kojima | B60W 30/182 |
| 2018/0226075 A1* | 8/2018 | Nayak | G10L 13/00 |
| 2019/0064804 A1* | 2/2019 | Frazzoli | B60W 60/0059 |

FOREIGN PATENT DOCUMENTS

| | | |
|---|---|---|
| DE | 10 2007 042 582 | 3/2009 |
| DE | 10 2007 042 583 | 3/2009 |
| DE | 102009048954 | 4/2011 |
| DE | 102013008605 | 11/2014 |
| DE | 10 2014 106 241 | 5/2015 |
| DE | 10 2014 214 078 | 1/2016 |
| DE | 102015201369 | 7/2016 |
| DE | 10 2015 205 580 | 9/2016 |
| EP | 3 192 695 | 7/2017 |
| WO | WO 2016/008887 | 1/2016 |

OTHER PUBLICATIONS

Written Opinion issued in corresponding PCT Application PCT/EP2018/078391.

* cited by examiner

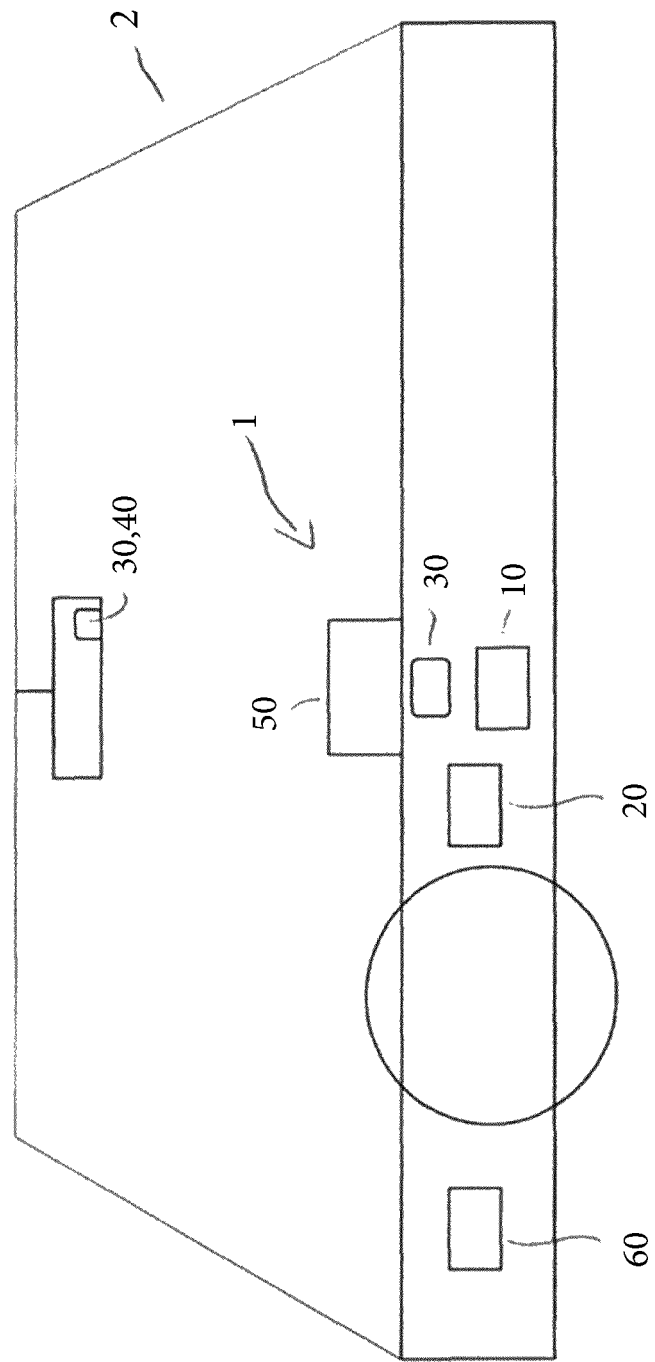

SYSTEM FOR AUTOMATED DRIVING WITH ASSISTANCE FOR A DRIVER IN PERFORMING A NON-DRIVING ACTIVITY

CROSS REFERENCE TO RELATED APPLICATIONS

This is a U.S. national stage of International application No. PCT/EP2018/078391, filed on Oct. 17, 2018, which claims priority to German Application No. 10 2017 219 955.5, filed Nov. 9, 2017, the content of each of which is incorporated herein by reference.

BACKGROUND OF THE INVENTION

1. Field of the Invention

The invention relates to a system for automated driving with assistance for a driver in performing a non-driving activity.

2. Related Art

A system for automated driving allows a vehicle to be controlled autonomously, with the driver able to perform non-driving activities during the autonomous driving according to the level of automation at which the system is functioning. Thus during autonomous driving by the system, the driver can become engrossed in a non-driving activity that demands his full attention or involves a high level of immersion. For example, the driver may be reading or writing an e-mail or other message on a tablet or smartphone.

During automated driving, situations repeatedly arise in which the system for automated driving must hand over control of the vehicle to the driver. This occurs, for instance, if the system for automated driving cannot cope with a traffic situation without support from the driver. In this case, the system for automated driving calls on the driver to take over the driving function.

Let it now be assumed that such a call by the system on the driver is issued at a point in time at which the driver has not yet completed his non-driving activity. Studies reveal that there is a clear tendency to pick up an interrupted action again when the objective of the action has still not been achieved (Ovsiankina effect). Applied to automated driving, this means that although the driver may in fact take over the driving function, the driver is nonetheless still occupied with his uncompleted non-driving activity in terms of both mental and oculomotor processes. Thus the driver attempts to complete his activity even though/while he is controlling the vehicle. As a result, the driver is distracted from the actual driving function and does not concentrate sufficiently on the road traffic, thereby increasing the risk of an accident. Systems today, after handing over the control function to the driver, interrupt the activity being performed.

SUMMARY OF THE INVENTION

An object of the present invention is to define a system for automated driving with assistance for a driver in performing a non-driving activity, in order that the driver, despite taking over control of the vehicle, can follow through as far as possible an already initiated non-driving activity while at the same time the risk of an accident resulting from distraction or lack of concentration is lower.

In one embodiment a system is provided for automated driving with assistance for a driver in performing a non-driving activity if the system switches from automated driving to the manual driving mode by the driver.

According to one aspect, the system for automated driving with assistance for the driver in performing a non-driving activity comprises an assistance device for assisting the driver in performing the non-driving activity. The system for automated driving is configured such that in a first operating state, the system controls the vehicle in an automated manner, and in a second operating state (manual operating state), the system hands over control of the vehicle to the driver. The assistance device is configured to assist the driver in performing the non-driving activity if the system for automated driving switches from the first operating state, i.e., from automated driving, into the second operating state, i.e., to the manual driving mode by the driver.

The assistance device assists the driver in this process such that the concentration of the driver on the road traffic or on controlling the vehicle is impaired as little as possible while the non-driving activity is continued or concluded. Thus by the assistance device, the system makes it possible for the driver to be able to complete interrupted activities after the handover from autonomous driving to manual driving without losing attention and concentration on driving and hence on the road environment.

According to a possible embodiment, the assistant can use sensors and/or algorithms to identify that the driver was not yet able to complete his non-driving activity on taking over manual control of the vehicle. The system, and in particular the assistance device, then pro-actively offers to assist the driver in concluding the non-driving activity, without the driver having to turn his attention away from the road traffic in the process. The assistance device can be equipped with a learning function (learning assistant). The assistance device learns over time the usage behavior and the preferences of the user, and provides a personalized strategy for concluding the non-driving activity.

BRIEF DESCRIPTION OF THE FIGURE

The invention is explained in more detail below with reference to a FIGURE, which is used to illustrate embodiments of the present invention. The FIGURE shows the interior of a vehicle comprising a system for automated driving with assistance for a driver in performing a non-driving activity.

DETAILED DESCRIPTION OF THE PRESENTLY PREFERRED EMBODIMENTS

A system 1 for automated driving of a vehicle 2 with assistance for a driver in performing a non-driving activity comprises an assistance device 10. The assistance device 10 is configured to assist the driver in performing a non-driving activity. The system 1 for automated driving can be operated in a first operating state in which the system controls the vehicle 2 in an automated manner. In a second operating state of the system 1 for automated driving, the system hands over control of the vehicle 2 to the driver. The assistance device 10 is configured such that it assists the driver in performing the non-driving activity if the system 1 for automated driving switches from the first operating state, i.e., the autonomous driving state, to the second operating state, i.e., manual control of the vehicle by the driver.

According to an embodiment, the system comprises an input device for inputting an instruction for assisting the driver in performing the non-driving activity. The system can be primarily voice-controlled. The input device 20 may be a microphone, for example, into which the driver inputs an instruction for assisting in performing the non-driving activity. The assistance device 10 is designed such that it assists the driver in performing the non-driving activity if the driver has input the instruction into the input device 20, in particular the microphone.

According to an embodiment, the assistance device 10 is configured such that the assistance device 10 offers assistance to the driver in performing the non-driving activity to the driver if the system 1 for automated driving switches from the first operating state (autonomous driving mode) to the second operating state (manual driving mode). The driver then has the option to accept or decline the offer from the assistance device 10 to assist him in performing the non-driving activity while he is controlling the vehicle.

According to another embodiment, the system 1 for automated driving can comprise a sensor device 30 for identifying an activity of the driver. The assistance device 10 is configured to assist the driver in performing the non-driving activity if the system 1 switches during automated driving from the first operating state (autonomous operating state) to the second operating state (manual operating state).

The sensor device 30 may comprise a camera 40, for example, for acquiring an image that shows a current activity of the driver. In the embodiment shown in the FIGURE, this camera 40 may be fitted, for instance, in the vehicle mirror inside the vehicle. The assistance device 10 is designed in this embodiment such that it can analyze the acquired image from the camera and identify the activity of the driver. Depending on the identified activity of the driver, the assistance device 10 can assist the driver in performing the non-driving activity or at least offer to the driver this assistance.

According to another embodiment of the system for automated driving, which embodiment is shown in the FIGURE, the system comprises an infotainment device 50 for offering an infotainment program. The infotainment device 50 can comprise, for example, a screen on which certain contents of the infotainment program of the vehicle are displayed. The assistance device 10 is configured such that it assists the driver in executing the infotainment program if the system 1 for automated driving switches from the autonomous operating state to the manual operating state. The sensor device 30 can be coupled, for example, to the infotainment device 50. The sensor device 30 can thereby identify a current activity of the driver during the automated driving, and assist the driver during manual driving in performing the non-driving activity on the infotainment device 50, or offer the driver this assistance.

According to another embodiment, the assistance device 10 can be configured to be a learning assistant. The assistance device 10 in this embodiment can be configured in particular to ascertain and learn the usage behavior of the driver in relation to the infotainment device 50. The assistance device 10 is configured in particular to assist the driver in executing the infotainment program according to the learned usage behavior.

In the case of a learning assistant, the assistance device 10 can be configured in particular such that it learns the behavior or the preferences of the driver in relation to the non-driving activity during autonomous driving. In this case, the assistance device 10 can assist the driver in performing the non-driving activity according to the learned behavior of the driver in relation to the non-driving activity.

For example, the assistance device 10 can be configured to learn certain behavior patterns of the driver. For instance, if the driver was occupied with reading messages during automated driving, and after taking over control of the vehicle has in the past regularly declined the offer from the assistance device 10 to read a message aloud, the assistance device 10 in future no longer offers to the driver to read the message aloud.

The learning function of the assistance device can also be embodied such that the assistance device learns over the course of time whether a driver prefers messages to be output in written or spoken form. The assistance device 10, when assisting the driver in relation to the non-driving activity, can accordingly display a text on a screen of the infotainment device 50 or output the text by loudspeaker output.

According to an embodiment, the assistance device 10 can be configured such that it assists the driver in performing a reading activity if the system 1 for automated driving switches from the first operating state (autonomous operating state) to the second operating state (manual operating state). For example, the assistance device can offer to the driver (via natural voice output) to read aloud a remaining part of an e-mail, of a message, of an online article, or of an e-book chapter, etc.

The driver would then have the option to accept the offer (via voice input). By coupling a camera to connected image processing system, for instance to an in-car eye-tracking system, and to the communication devices of the driver (smartphone, tablet, etc.), the assistance device can determine a corresponding passage in a text that the driver has just read. This passage in the text can then be read aloud by voice output. By natural voice dialog, the driver has the option at any time to jump forwards and backwards in the text and to pause the voice output from the assistant.

According to another embodiment, the system comprises a voice input device 60 for voice input. The voice input device 60 may be a microphone, for example. The assistance device 10 is configured such that it assists the driver in performing a writing activity. For this purpose, the assistance device 10 is configured to convert acoustic signals received via the voice input device 60 into written text if the system 1 for automated driving switches from the autonomous operating state to the manual operating state. The written text can be displayed on a screen, for example on a monitor of the infotainment device 50.

The assistance device 10 can offer to a driver, for example, to finish an e-mail or a message that the driver started to write during the autonomous driving mode. If the driver accepts the offer (via voice input), the assistance device reads aloud the last lines, for example, of the already drafted message for example. The driver can then dictate the additional text, get the text read again aloud, and finally send the text. The interaction between the driver and the assistance device can take place entirely via natural voice dialog.

By active assistance for a driver in concluding the interrupted non-driving activity, the defined system allows safe driving after the transfer of the driving task from autonomous to manual driving without the driver having to turn his attention away from independent driving and hence from the road environment. The defined solution increases safety during driving because the driver performs his actual activity, i.e., manual driving, and is not distracted by his initiated secondary activity. The system for automated driving with assistance for the driver in performing the non-driving activity can be used in principle in all means of transportation. These include, in addition to autonomously driving vehicles, also rail vehicles in rail transport, which can assist a train driver, for instance.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Instead, the above description gives the person skilled in the art a guideline for the implementation of at least one exemplary embodiment, wherein various changes may be made, especially with regard to the function and arrangement of the component parts described, without departing from the scope of protection as emerges from the claims and combinations of features equivalent thereto.

The invention claimed is:

1. An automated driving system (1) with assistance for a driver of a vehicle (2) in performing a non-driving activity, comprising:
    an assistance device (10) configured to assist the driver in performing the non-driving activity; and
    a sensor (30) configured to identify an activity of the driver,
    wherein the automated driving system (1), in a first operating state controls the vehicle (2) in an automated manner, and in a second operating state hands over control of the vehicle to the driver,
    wherein the assistance device (10) is configured to assist the driver in performing the non-driving activity if the automated driving system (1) switches from the first operating state to the second operating state,
    wherein the non-driving activity includes the outputting to the driver of received messages, and the assistance device (10) is further configured to determine, based upon information from the sensor, a corresponding passage in a text of a passage that the driver has just read, and
    wherein the assistance device (10) is further configured to offer the driver to finish an e-mail or message that the driver started to write during the autonomous driving mode.

2. The system as claimed in claim 1, further comprising:
    an input (20) configured to input an instruction for assisting the driver in performing the non-driving activity,
    wherein the assistance device (10) is further configured to assist the driver in performing the non-driving activity if the instruction has been input into the input (20).

3. The system as claimed in claim 2, wherein the assistance device (10) is further configured to offer assistance to the driver in performing the non-driving activity if the automated driving system (1) switches from the first operating state to the second operating state.

4. The system as claimed in claim 3,
    wherein the sensor (30) comprises a camera (40) configured to acquire an image that shows the activity of the driver, and
    wherein the assistance device (10) is further configured to analyze the acquired image and identify the activity of the driver.

5. The system as claimed in claim 4, further comprising:
    an infotainment device (50) configured to offer an infotainment program,
    wherein the assistance device (10) is further configured to assist the driver in executing the infotainment program if the automated driving system (1) switches from the first to the second operating state.

6. The system as claimed in claim 5,
    wherein the assistance device (10) is further configured to:
        ascertain and learn usage behavior of the driver in relation to the infotainment device (50), and
        assist the driver in executing the infotainment program according to the learned usage behavior.

7. The system as claimed in claim 1,
    wherein the assistance device (10) is further configured to learn the behavior of the driver in relation to the non-driving activity during the first operating state of the automated driving system (1), and
    wherein the assistance device (10) is further configured to assist the driver in performing the non-driving activity according to the learned behavior of the driver in relation to the non-driving activity.

8. The system as claimed in claim 1,
    wherein the assistance device (10) is further configured to assist the driver in performing a reading activity if the automated driving system (1) switches from the first operating state to the second operating state.

9. The system as claimed in claim 1, further comprising:
    a voice input (60),
    wherein the assistance device (10) is configured to assist the driver in performing a writing activity by converting acoustic signals received via the voice input (60) into written text if the automated driving system (1) switches from the first operating state to the second operating state.

* * * * *